(12) United States Patent
Ap et al.

(10) Patent No.: US 6,253,548 B1
(45) Date of Patent: Jul. 3, 2001

(54) EXHAUST SYSTEM FOR A MOTOR VEHICLE ENGINE

(75) Inventors: Ngy Srun Ap, Saint Remy les Chevreuse; Denis Perset, Paris, both of (FR)

(73) Assignee: Valeo Thermique Moteur, La Verriere (FR)

(*) Notice: Subject to any disclaimer, the term of this patent is extended or adjusted under 35 U.S.C. 154(b) by 0 days.

(21) Appl. No.: 09/169,503

(22) Filed: Oct. 9, 1998

(30) Foreign Application Priority Data

Oct. 10, 1997 (FR) ................................... 97 12704

(51) Int. Cl.⁷ ................................. F01N 3/02; F01N 5/02
(52) U.S. Cl. ................................................ 60/320; 60/298
(58) Field of Search .............................. 60/298, 320, 274, 60/618, 287, 288, 324; 123/568.11

(56) References Cited

U.S. PATENT DOCUMENTS

| | | | |
|---|---|---|---|
| 3,050,935 | * | 8/1962 | Eastwood ................................. 60/287 |
| 5,184,462 | * | 2/1993 | Schatz ..................................... 60/320 |
| 5,603,215 | * | 2/1997 | Sung et al. .............................. 60/298 |

FOREIGN PATENT DOCUMENTS

| | | |
|---|---|---|
| 195 00 472 | 7/1996 | (DE) . |
| 195 00 476 | 7/1996 | (DE) . |
| 197 006 626 | 9/1997 | (DE) . |
| 47-20659 * | 6/1970 | (JP) ........................................ 60/298 |
| 81-09822 * | 11/1994 | (JP) ........................................ 60/298 |

OTHER PUBLICATIONS

French Search Report dated Jun. 11, 1998.

* cited by examiner

Primary Examiner—Jeanette Chapman
Assistant Examiner—Sneh Varma
(74) Attorney, Agent, or Firm—Morgan&Finnegan, LLP.

(57) ABSTRACT

This invention relates to an exhaust system with a catalytic converter for the exhaust gases of an internal combustion engine of a motor vehicle. The system comprises at least one heat exchanger having a cooling fluid therein, selector means for selectively directing the exhaust gases, wholly or partly, into the heat exchanger in order to cool them, and means for using the heat of the heat exchanger cooling fluid to heat the passenger compartment of the vehicle. The heat exchanger may be located upstream or downstream of the catalytic converter.

The invention provides depollution of the exhaust gases and heating of the passenger compartment.

8 Claims, 3 Drawing Sheets

EXHAUST SYSTEM FOR A MOTOR VEHICLE ENGINE

FIELD OF THE INVENTION

This invention relates to an exhaust system with a catalytic converter for the exhaust gases from an internal combustion engine of a motor vehicle.

BACKGROUND OF THE INVENTION

Exhaust systems for motor vehicles are increasingly of the "catalytic converter" type. The function of the catalytic converter is to reduce the quantity of polluting gases emitted by the engine.

Catalytic converters contain a support material, generally alumina, onto which the noble metals which function as catalysts are deposited. In order to function correctly, the operating temperature of the catalytic converter must be sufficiently high. Motor vehicle manufacturers therefore tend to locate the catalytic converter as close as possible to the exhaust manifold so that the catalytic converter warms up as quickly as possible when the engine is started from cold.

On the other hand, excessively high operating temperatures reduce the service life of a catalytic converter by irreversible transformation of the support material. Such temperatures can also damage the entire exhaust system and necessitate the use of stronger and therefore more costly materials for each component of the exhaust system (muffler, exhaust pipes, etc). Such temperatures can be reached when the engine is working hard, for example on a freeway.

What is more, the improved thermal efficiency of internal combustion engines, in particular fuel injected diesel or petrol engines, reduces heat losses to the cooling circuit. The heat required to heat the passenger compartment is taken from the cooling circuit. Improved efficiency can therefore lead to insufficient heating.

Finally, the necessity to reduce polluting emissions from internal combustion engines has led to the use of new types of catalytic converter, one feature of which is that they operate within a narrow range of temperatures.

The present invention aims to mitigate these drawbacks. More precisely, the invention aims to limit or to regulate the temperature of the gases entering the catalytic converter whilst enabling the catalytic conventer to warm up quickly. The invention also aims to improve the heating of the passenger compartment of the vehicle and the conversion rate of the catalytic converter.

SUMMARY OF THE INVENTION

The invention provides an exhaust system with a catalytic converter for the exhaust gases from an internal combustion engine of a motor vehicle characterized in that it comprises at least one heat exchanger incorporating cooling fluid therein, selector means for selectively directing the exhaust gases, wholly or partly, into said heat exchanger for effecting cooling thereof, and means for using the heat of the cooling fluid from said exchanger to heat the passenger compartment of the vehicle.

Thus the exhaust system of the invention firstly reduces the temperature of the exhaust gases entering the catalytic converter because they are passed through the heat exchanger to cool them before they enter it. However, the exchanger does not compromise the warming up of the catalytic converter since the selector means enable the gases to bypass the exchanger until they have reached a sufficiently high temperature. Furthermore, the heat recovered in this way from the exhaust gases can be used to heat the passenger compartment of the vehicle. To this end the engine cooling fluid preferably passes through the heat exchanger because the heat from that fluid is already used to heat the passenger compartment.

Finally, the exhaust system of the invention regulates the temperature of the exhaust gases entering the catalytic converter by causing a certain flow of exhaust gas through the exchanger.

In a first embodiment of the invention the heat exchanger is located upstream of the catalytic converter in the direction of flow of the exhaust gases, and a pipe is provided for bypassing the heat exchanger, and the selector means comprise at least one valve upstream of the exchanger for selectively directing the exhaust gases, wholly or partly, into said exchanger or into said pipe.

The said valve can have one inlet and one outlet or one inlet and two outlets. In the latter variant either of the two outlets can be fed from the inlet, or both outlets can be fed simultaneously from said inlet.

In this case, the selector means comprise a second valve disposed between the heat exchanger and the catalytic converter at the discharge point of the pipe. The second valve connects the inlet of the catalytic converter either to the outlet of the heat exchanger or to the bypass pipe.

In another embodiment of the invention, the heat exchanger is located downstream of the catalytic converter in the direction of flow of the exhaust gases, a pipe being provided for bypassing the heat exchanger, and the selector means comprising at least one valve between the catalytic converter and the heat exchanger for selectively directing the exhaust gases, wholly or partly, into said heat exchanger or into said pipe.

In this second embodiment the device of the invention can also comprise a second pipe for bypassing the catalytic converter, the selector means comprising at least one valve for selectively directing the exhaust gases, wholly or partly, into the catalytic converter or into said second pipe, a third pipe being provided for conveying the exhaust gases from the outlet of the heat exchanger to the inlet of the catalytic converter.

Alternatively, in the second embodiment, the device of the invention can comprise a cooling loop upstream of the catalytic converter, the selector means comprising a valve for selectively directing the exhaust gases, wholly or partly, into said loop or directly into the catalytic converter.

Consequently, the heat exchanger is located upstream of the catalytic converter in the first embodiment, and downstream of it in the second embodiment. In the first embodiment the exhaust gases coming directly from the exhaust manifold therefore flow through the heat exchanger, which therefore benefits from a high operating temperature. Thus in this case priority is given to heating the passenger compartment.

In the second embodiment, on the other hand, priority is given to preventing pollution. In normal operation the heat exchanger is downstream of the catalytic converter. The catalytic converter therefore operates at a higher temperature, and so under more effective conditions, but the exhaust gases begin to cool in the converter. Their temperature is therefore lower when they enter the heat exchanger which therefore recovers less heat.

Particular embodiments of the invention will now be described by way of non-limiting example and with reference to the accompanying drawings.

BRIEF DESCRIPTIONS OF THE DRAWINGS

Figure 4B:
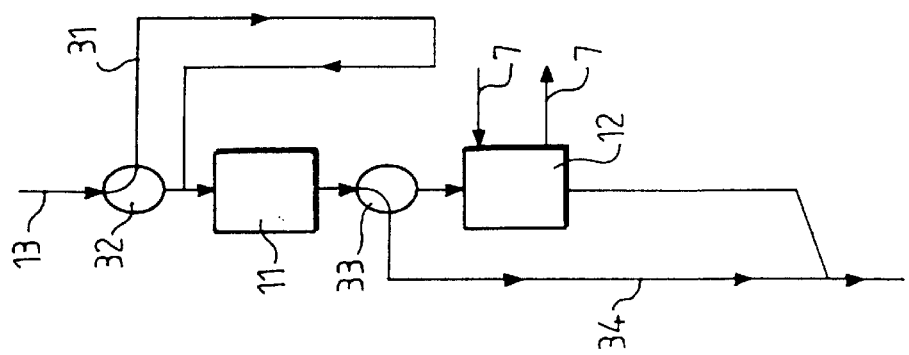
Figure 4A:
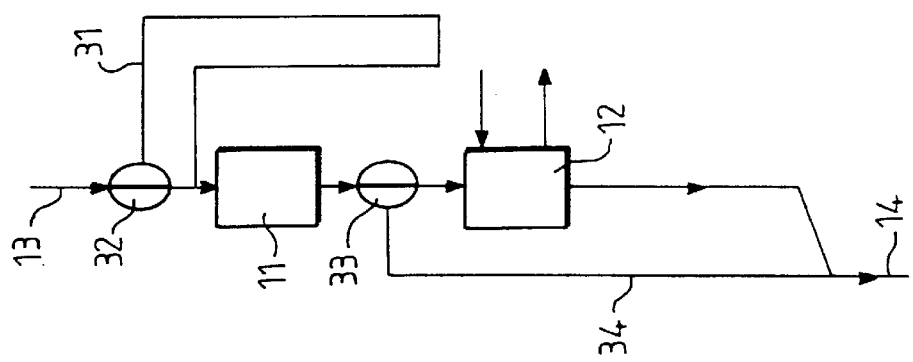
Figure 3B:
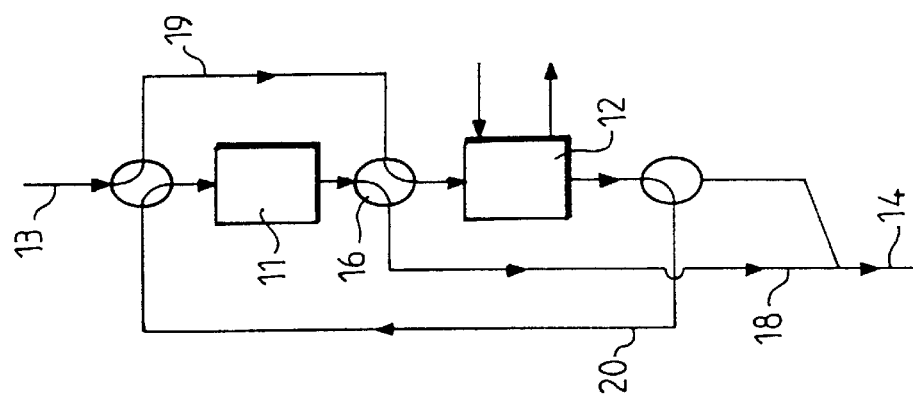
Figure 3A:
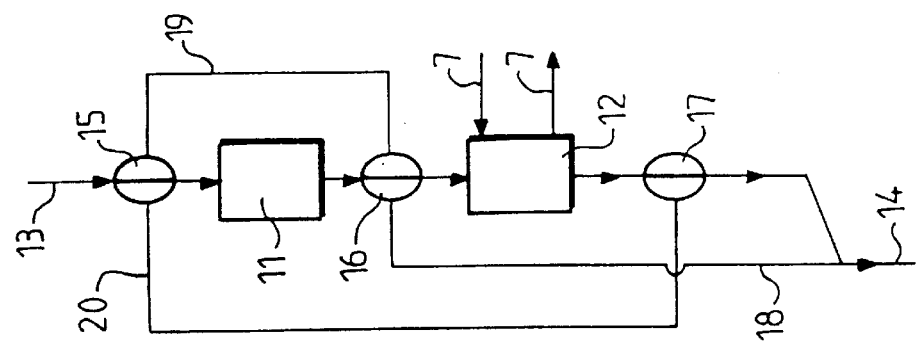

FIGS. 3a and 3b show a second embodiment in two different operating configurations; and FIGS. 4a and 4b are views similar to FIGS. 3a and 3b of a third embodiment.

DESCRIPTION OF THE PREFERRED EMBODIMENTS OF THE INVENTION

The device shown in FIG. 1 is disposed between a pipe 1 coming from the exhaust manifold of the engine and a pipe 2 venting the exhaust gases to the atmosphere.

A heat exchanger 3 is disposed upstream of the catalytic converter 4 in the direction of flow of the exhaust gases, i.e. in the direction from the pipe 1 to the pipe 2.

A pipe 5 connecting its upstream side to its downstream side can bypass the heat exchanger 3. To this end selector means such as a three-way valve 6 are disposed at the entry of the heat exchanger 3 to direct the gases from the pipe 1 selectively to the heat exchanger 3 or to the pipe 5.

Finally, the cooling fluid enters and leaves the heat exchanger 3 via pipes 7. The pipes 7 can be connected by any suitable means to the engine cooling circuit.

Figure 1C:
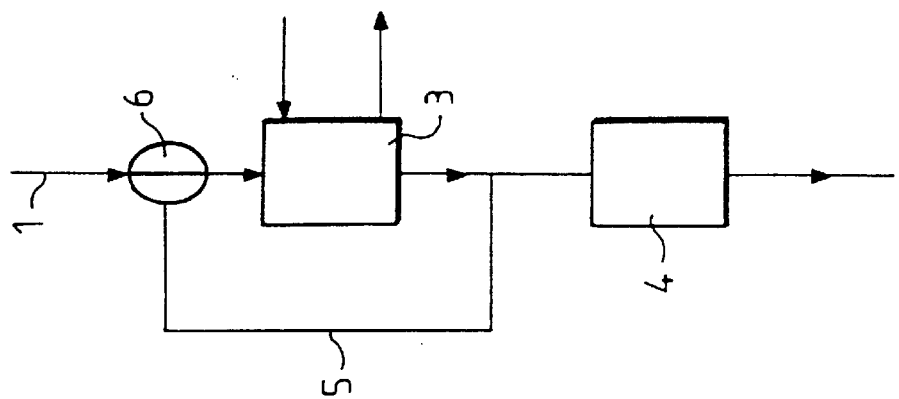
FIGS. 1a through 1c show a first embodiment of the invention in three different operating configurations.
Figure 1B:
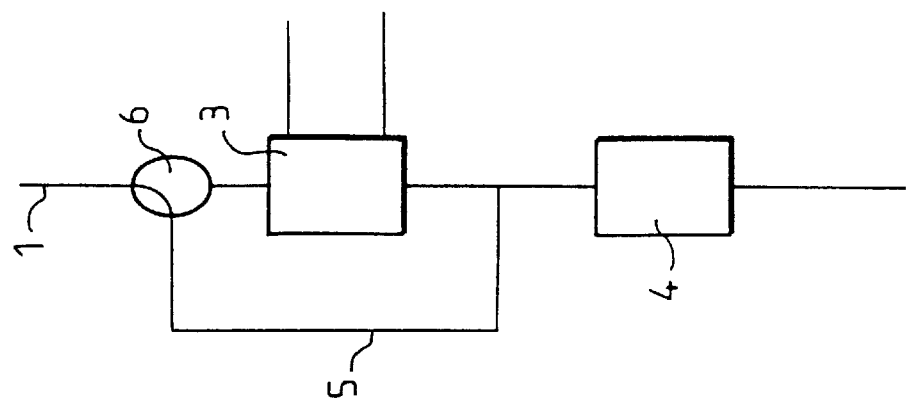
Figure 1A:
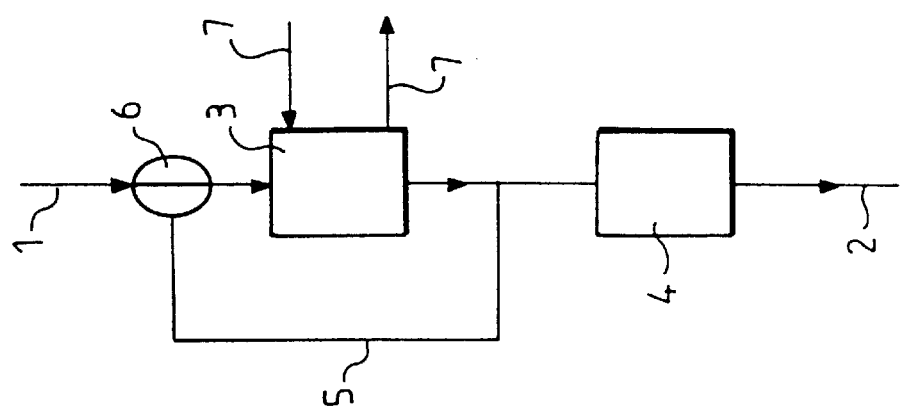

The FIG. 1a configuration is adopted when the temperature of the gases in the pipe 1 exceeds the critical operating temperature of the catalytic converter, which is in the order of 700° C., for example. In this case, the three-way valve 6 is set so that the exhaust gases flow through the heat exchanger 3 before entering the catalytic converter 4 regardless of the setting of the heating controls.

FIGS. 1b and 1c correspond to the situation in which the temperature of the gases is below the critical operating temperature of the catalytic converter. In this case the position of the valve 6 depends on the setting of the heating controls.

If the heating is not turned on, the valve 6 is set so that the gases from the pipe 1 are routed directly to the inlet of the catalytic converter 4 via the pipe 5 as shown in FIG. 1b. The heat exchanger 3 is not used in this case.

In FIG. 1c, on the other hand, the heating is turned on. In this case the exhaust gases are cooled in the heat exchanger 3 even though this is not necessary for operation of the catalytic converter. The valve 6 is therefore set so that the gases from the pipe 1 are directed through the heat exchanger 3 before they enter the catalytic converter 4. It will be understood that priority is given to heating because reducing the temperature of the gases below the critical temperature causes the catalytic converter to operate with reduced efficiency.

In a variant of the FIG. 1 embodiment, a second three-way valve is provided at the junction of the pipe 5 and the pipe 8 between the outlet of the heat exchanger 3 and the inlet of the catalytic converter 4. The second valve is operated simultaneously with the valve 6 to connect the inlet of the catalytic converter 4 either to the outlet of the heat exchanger 3 in the configuration corresponding to that of FIGS. 1a and 1c, or to the pipe 5 in the configuration corresponding to that of FIG. 1b. The second valve can therefore totally isolate the heat exchanger 3 when it is not in use.

Figure 2A:
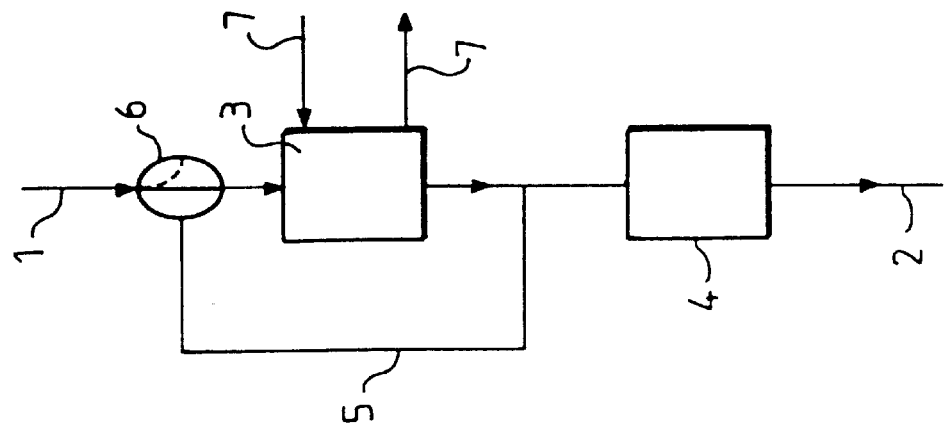
FIGS. 2a through 2c show a variant of this first embodiment of the invention in the aforementioned three operating configurations.
Figure 2B:
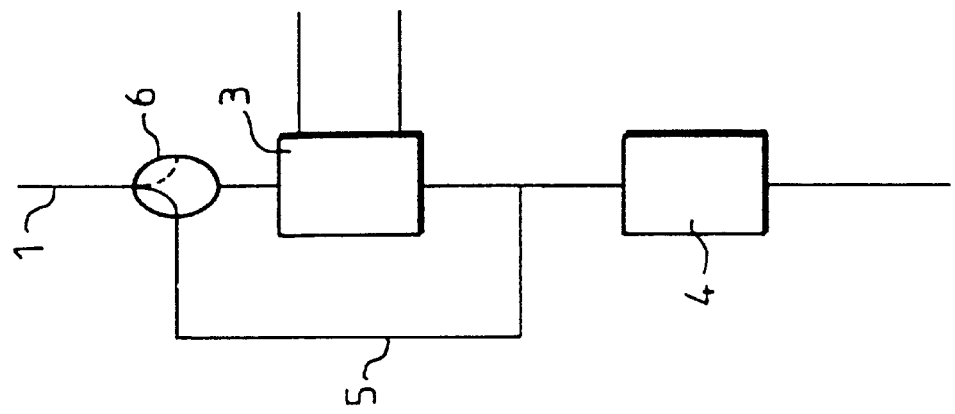
Figure 2C:
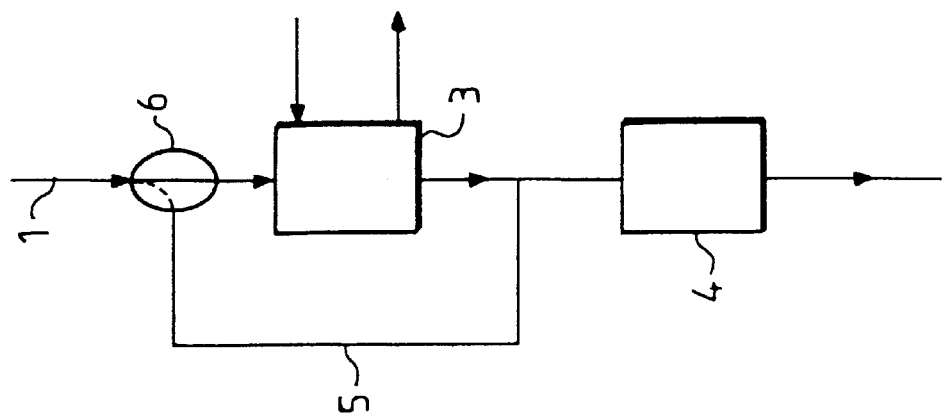

FIGS. 2a through 2c show another variant of the embodiment from FIGS. 1a through 1c which differs from the latter in the structure of the valve 6. In FIGS. 1a through 1c the valve 6, or to be more precise its moving part, has only one inlet and only one outlet. In FIGS. 2a through 2c it has one inlet and two outlets. The inlet can feed either or both outlets simultaneously. In other words, the valve can direct the exhaust gases in one or other of two directions or in both directions at the same time.

In the configurations of FIGS. 2a and 2b, the valve directly sends the exhaust gases in a single direction and so the corresponding configurations are those of FIGS. 1a and 1b described above, respectively. In the FIG. 2c configuration, on the other hand, the valve directs the exhaust gases simultaneously in two directions, i.e. towards the heat exchanger 3 and towards the pipe 5. Thus the valve from FIGS. 2a and 2b can direct the flow of exhaust gas partly or wholly into the heat exchanger.

FIGS. 3a and 3b show a situation in which the catalytic converter 11 is upstream of the heat exchanger 12 in the normal direction of flow of the exhaust gases, from the inlet pipe 13 connected to the exhaust manifold to the pipe 14 for venting the exhaust gases to the atmosphere.

In this case there are, in succession, a first four-way valve 15 upstream of the catalytic converter 11, a second four-way valve 16 between the outlet of the catalytic converter 11 and the inlet of the heat exchanger 12, and a three-way valve 17 downstream of the heat heat exchanger 12.

A pipe 18 for bypassing the heat exchanger 12 is disposed between the valve 16 and the pipe 14. A second pipe 19 for bypassing the catalytic converter 11 is disposed between the valve 15 and the valve 16. Finally, a third pipe 20 for returning gases leaving the heat exchanger 12 to the inlet of the catalytic converter 11 is disposed between the valve 15 and the valve 17.

If the temperature of the gases in the pipe 13 is lower than the critical operating temperature of the catalytic converter, the valves 15, 16 and 17 are set as shown in FIG. 3a. The gases then flow in succession through the catalytic converter 11 and through the heat exchanger 12. In this way the heat exchanger does not delay the warming up of the catalytic converter and takes off heat to heat the passenger compartment.

On the other hand, if the temperature of the gases in the pipe 13 exceeds the critical operating temperature of the catalytic converter, the valves are set as shown in FIG. 3b. The pipe 19 initially bypasses the catalytic converter 11 in order to convey the excessively hot gases to the heat exchanger 12. The partly cooled gases are taken from the outlet of the heat exchanger 12 via the pipe 20 to the inlet of the catalytic converter 11. Finally, they are directed from the outlet of the pipe 11 via the valve 16 to the pipe 18 for bypassing the heat exchanger 12 and then to the pipe 14 for venting them to the atmosphere.

Note that the four-way valves 15 and 16 could be replaced by three-way valves. The pipe 20 would then be connected to the main line between the outlet of the valve 15 and the inlet of the catalytic converter 11. Similarly, the pipe 19 would be connected to the main line between the outlet of the valve 16 and the inlet of the heat heat exchanger 12.

Finally, in the variants shown in FIGS. 4a and 4b the catalytic converter 11 is again on the upstream side of the heat exchanger 12 between the pipes 13 and 14. However, in this case the heat exchanger 12 is used only to recover heat for heating the passenger compartment. Here the gases at the inlet of the catalytic converter 11 are cooled by a cooling loop 31 upstream of the catalytic converter 11.

A first three-way valve 32 directs the gases from the pipe 13 either directly to the inlet of the catalytic converter 11 or to the cooling loop 31 which is in turn connected to the main line at the inlet of the catalytic converter 11. A second three-way valve 33 directs the gases from the outlet of the catalytic converter 11 either to the heat exchanger 12 or into a pipe 34 for bypassing the heat exchanger 12 leading to the pipe 14.

If the temperature of the gases in the pipe 13 is below the critical operating temperature of the catalytic converter the valve 32 is set as shown in FIG. 3a to convey these gases directly to the inlet of the catalytic converter 11. The gases are directed from the outlet of the catalytic converter via the valve 33 to the heat exchanger 12.

If the temperature of the gases in the pipe 13 is above the critical operating temperature of the catalytic converter, the valve 32 is set as shown in FIG. 4b to direct these gases towards the cooling loop 31. The valve 33 directs the gases from the outlet of the catalytic converter 11 into the pipe 34 for bypassing the heat exchanger 12. Note that the cooling loop 31 can comprise a gas-air exchanger or a gas-water exchanger.

Note that the above description refers to valves but it is feasible for the valves to be replaced by any other selector means.

What is claimed is:

1. An exhaust system comprising:
    a catalytic converter;
    a heat exchanger containing cooling fluid, said heat exchanger being located upstream of the catalytic converter in the direction of the flow of the exhaust gases;
    a pipe for bypassing the heat exchanger;
    a first valve upstream of the heat exchanger which directs the exhaust gases into the heat exchanger or the pipe; and
    a second valve connecting the catalytic converter either to the heat exchanger or to the pipe, said second valve being disposed between the heat exchanger and the catalytic converter.

2. An exhaust system comprising:
    a catalytic converter;
    a heat exchanger containing cooling fluid, said heat exchanger being located downstream of the catalytic converter;
    a first pipe for bypassing the heat exchanger;
    a first valve located upstream of the catalytic converter;
    a second pipe for bypassing the catalytic converter;
    a second valve located between the catalytic converter and the heat exchanger;
    a third valve located downstream of the heat exchanger; and
    a third pipe which returns the exhaust gases leaving the heat exchanger to the catalytic converter.

3. A motor vehicle comprising the exhaust system of claim 1.

4. A motor vehicle comprising the exhaust system of claim 2.

5. The exhaust system according to claim 1, wherein the heat from the cooling fluid of the heat exchanger is recycled to heat a passenger compartment.

6. The exhaust system according to claim 2, wherein the heat from the cooling fluid of the heat exchanger is recycled to heat a passenger compartment.

7. An exhaust system for a motor vehicle, comprising:
    a catalytic converter;
    at least one heat exchanger containing cooling fluid located downstream of the catalytic converter;
    a first pipe is provided for bypassing the heat exchanger;
    a first valve upstream of said heat exchanger for selectively directing the exhaust gases into said heat exchanger or into said pipe,
    a second pipe for bypassing the catalytic converter,
    a second valve for selectively directing the exhaust gases into the catalytic converter or into said second pipe, and
    a third pipe for conveying the exhaust gases from an outlet of said heat exchanger to an inlet of the catalytic converter.

8. The exhaust system according to claim 7, wherein the heat from the cooling fluid of the heat exchanger is recycled to heat a passenger compartment.

\* \* \* \* \*